United States Patent Office.

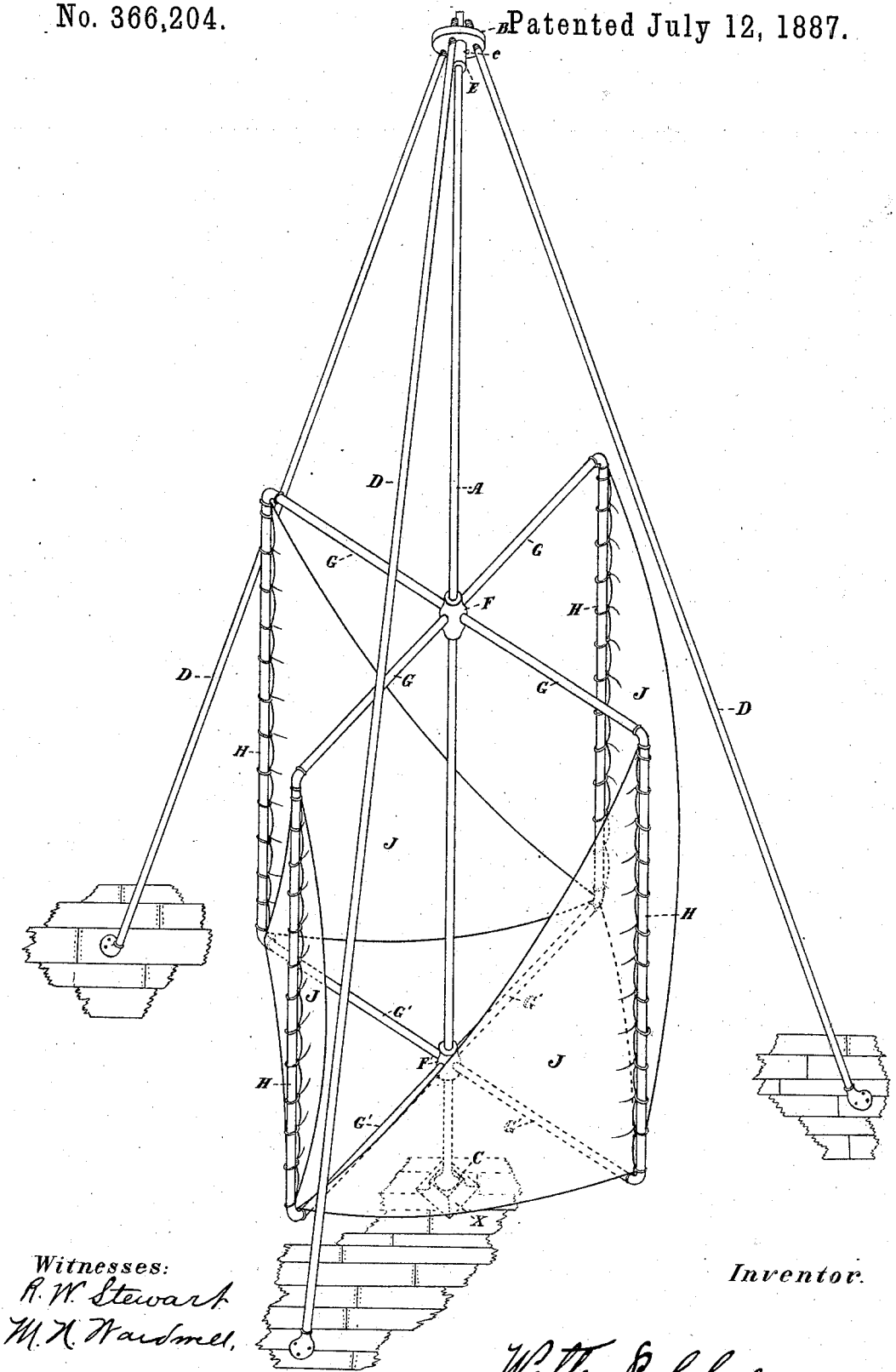

WALTER R. CLOSE, OF BANGOR, MAINE, ASSIGNOR OF ONE-FOURTH TO ADOLPHUS J. CHAPMAN, OF SAME PLACE.

WIND-ENGINE.

SPECIFICATION forming part of Letters Patent No. 366,204, dated July 12, 1887.

Application filed February 3, 1887. Serial No. 226,483. (No model.)

*To all whom it may concern:*

Be it known that I, WALTER R. CLOSE, a citizen of the United States, residing at Bangor, in the county of Penobscot and State of Maine, have invented a new and useful Wind-Engine; and I do hereby declare that the following is a full, clear, and exact description of the invention, which will enable others skilled in the art to which it appertains to make and use the same.

My invention relates to an improved wind-engine which, from its peculiar construction, is especially adapted for operation in certain classes of cases hereinafter particularly specified, and is illustrated in the accompanying drawing, in which the figure is an isometric view.

My device consists of a vertical shaft, A, arranged to have its upper end turn in a box, B, and its lower end upon the step C, suitably placed to receive it.

In the drawing, the box B is supported by a three-legged frame, D, the lower extremities of which are secured to a floor, deck, or any other foundation, upon which the step C is also secured.

E is a collar adjustable upon the length of the shaft A, and secured by a set-screw, e, or other appropriate device, which, bearing upon the under side of the box B or closely approaching thereto, prevents the shaft A from rising out of the step C.

F F' are hubs rigidly fixed to and turning with the shaft A. Four arms, G, each at right angles with the next, project radially from the hub F, and a like number of arms, G', project from the hub F' in the same direction as the arms G. A mast, H, is secured to and supported between the external ends of each pair of arms G G'. A triangular or leg-of-mutton sail, J, is bent by its luff to each of the masts H and its clew made fast to the outer extremity of the adjacent arm G'. More than four sails may perhaps be used; but I believe that four will best serve the purpose.

The peculiarity of this form of wind-engine lies in the fact that the sails being all spread in the same direction as the first, and as shown in the drawing, the shaft A will be revolved from left to right, and in that direction only, irrespective of the quarter from which the wind may come, while with the sails spread in the opposite direction—that is, swung round to the opposite sides of the masts and their clews made fast to the ends of the arms G' opposite diametrically to the arms to which they were first made fast—the shaft A will revolve constantly in the opposite direction—from right to left—and in that direction only. As the sails are so arranged as to catch the breeze from any and every quarter, the engine will always operate whenever there is wind enough to overcome its inertia and the friction of the parts.

By means of proper connections with the shaft A the power obtained may be used in any usual way for any purpose; but there are two particular applications to which my device is especially adapted. First, to the operation of fog-signals, when the frame D and step C are secured directly to a ledge. The bell could be struck in various ways, but I contemplate a clapper hung similarly to a trip-hammer and lifted by the passage of the arms G' over its external end; and, second, for use upon sailing-vessels with an auxiliary screw-propeller. In this application the engine should preferably be placed on deck forward and the step C in the hold upon the vessel's keelson, the shaft A being of course prolonged from the deck to the step. It would then be geared at any convenient point above the step with the propeller-shaft by bevel-gears, or by any usual means.

The essential advantage of this application of the device is that it will operate as well with a head wind as with one from any other quarter, and the more violent the gale the more powerful the operation of the machine—a most important consideration in working a vessel off a lee-shore.

Having thus described my invention, what I claim, and desire to secure by Letters Patent, is—

A wind-engine consisting of the combination of a revolving shaft supported at one end in a box or bearing and at the other end upon a step or in a box, and four triangular-shaped sails bent by their luffs to masts supported by radial arms projecting from said shaft at right angles to each other, each of said sails having its clew made fast to the outer extremity of the radial arm next adjacent in the rear, substantially as described.

WALTER R. CLOSE.

Witnesses:
M. H. WARDWELL,
R. W. STEWART.